United States Patent [19]
Qutub

[11] Patent Number: 5,988,308
[45] Date of Patent: Nov. 23, 1999

[54] FLEXIBLE ARTICULATED COUPLING THAT MINIMIZES LEAKAGE

[75] Inventor: Ibrahim Qutub, Beaverton, Oreg.

[73] Assignee: Freightliner Corporation, Portland, Oreg.

[21] Appl. No.: 08/708,204

[22] Filed: Sep. 6, 1996

[51] Int. Cl.[6] .................................................. F16L 3/16
[52] U.S. Cl. ........................................... 180/309; 285/62
[58] Field of Search ............................ 180/309; 285/62, 285/104, 110, 179, 181, 264

[56] References Cited

U.S. PATENT DOCUMENTS

| | | |
|---|---|---|
| 677,809 | 7/1901 | Shields . |
| 2,451,252 | 10/1948 | Stoeckly ................................... 285/96 |
| 4,776,617 | 10/1988 | Sato ......................................... 285/165 |
| 4,856,822 | 8/1989 | Parker ....................................... 285/62 |
| 5,069,487 | 12/1991 | Sheppard . |
| 5,286,071 | 2/1994 | Storage ................................... 285/226 |
| 5,340,165 | 8/1994 | Sheppard ................................ 285/226 |

*Primary Examiner*—Richard M. Camby
*Attorney, Agent, or Firm*—Klarquist Sparkman Campbell Leigh & Whinston, LLP

[57] ABSTRACT

A flexible coupling suitable for use in an automobile exhaust system having axially spaced conduit sections. Upstream and downstream conduit sections are held end to end by an intermediate coupling member. The upstream conduit has a part-spherical end connector that fits within a complementary part-spherical socket of the coupling member. Similarly, the coupling member has a part-spherical end connector that fits within a complementary part-spherical socket of the downstream conduit. The part-spherical connectors permit relative pivotal and rotational movement of the upstream and downstream connectors relative to the coupling member. Each of the part-spherical connectors tapers internally to an annular lip, so that the flow of gas increases to create a venturi effect. The venturi effect establishes a relative vacuum at the junctions between the coupling member and the conduits to oppose escape of gas (such as exhaust fumes) from the coupling. The coupling member may be curved to accommodate relative axial movement of the upstream and downstream conduit sections.

13 Claims, 4 Drawing Sheets

FLEXIBLE ARTICULATED COUPLING THAT MINIMIZES LEAKAGE

FIELD OF THE INVENTION

This invention relates to a flexible joint for connecting pipe or conduit sections. More particularly, it relates to a flexible articulated coupling that minimizes leakage of gas, for example in an engine exhaust system.

GENERAL DISCUSSION OF THE BACKGROUND

Flexible joint couplings have previously been used to connect conduit sections, for example in exhaust pipes or underground water conduits. Such flexible couplings are particularly useful because they allow relative movement between adjacent conduit sections, which permits the conduit sections to flex without breaking. Various flexible couplings have previously been designed that allow pivotal, rotational or axial movement between independent sections of the conduit.

A specific example of a flexible coupling member is shown in U.S. Pat. No. 677,809, wherein the coupling includes two axially spaced steam or liquid conduits. The ends of the conduit, which are to be joined in the coupling, terminate in a ball-shaped end. Each ball shaped end is pivotally held in a hollow case within which the balls can move, which allows the conduits to flex at the case and move relative to one another. The conduits abut against the walls of the case to limit the angular flexion of the conduits.

U.S. Pat. No. 4,776,617 discloses a telescopic swivel pipe joint for flexibly coupling pipes, such as underground water supply lines. This joint allows the connected water lines to slide telescopically within a sleeve, or move pivotally and rotationally inside a separate joint connector. The freedom of movement imparted by the joint helps the pipes withstand earthquakes and ground subsidence without breaking.

Flexible pipe joints have previously been used in engine exhaust systems for gasoline powered vehicles and aircraft. Flexible couplings are important in such an environment, where engine action creates torque that is transmitted to an attached exhaust line. Flexible couplings have been widely used in the past in an attempt to isolate the transmission of this torque through the exhaust conduit to the chassis or muffler.

An example of a flexible conduit joint in an exhaust system is shown in U.S. Pat. No. 2,451,252, wherein the joint includes axially spaced conduit sections joined by flexible ball slip joints. The ball slip joints have wide separations through which gas in the exhaust system leaks from the joints. To avoid this leakage, the separations at each joint are filled with a resilient seal that minimizes loss of exhaust gases from the joint. A flexible bellows also encloses the joint to hermetically seal the conduit against loss of exhaust gases.

U.S. Pat. No. 4,856,822 discloses a series of part-spherical flexible joints for connecting exhaust pipes or other conduits. Each joint includes a pair of part spherical mated sealing surfaces that slide against each other to allow the pipe to pivot.

Additional examples of flexible connectors in exhaust systems are shown in U.S. Pat. No. 5,069,487, U.S. Pat. No. 5,286,071 and U.S. Pat. No. 5,340,165. Each of these patents discloses a bellows sealed ball joint that permits pivotal movement between axially spaced sections of conduit joined by the connector.

Another example of an exhaust line connector is the flexible connector available from Exhaust & Filtration Systems of Stoughton, Wisconsin. The flexible joint of this connector includes a series of interlocking rings. The interlocking rings, however, tend to deform and become locked in place during use. These mechanical problems limit the useful life of the exhaust connector, which typically begins leaking well before the end of the useful life of the vehicle in which the connector is installed.

It is an object of this invention to provide an improved flexible coupling that minimizes the loss of gases (such as exhaust fumes) from the coupling.

Yet another object of the invention is to provide such a coupling that has an extended useful life, and will last (for example) in a vehicle exhaust system for as long as the useful life of the vehicle in which the coupling is used.

Moreover, it is an object of the invention to provide such a coupling that does not require the use of an external bellows or other sealing member to inhibit or prevent the loss of gas from the coupling.

SUMMARY OF THE INVENTION

In one embodiment of the invention, independently pivotal and rotatable first and second conduits are engaged with one another along a mating junction. A reduced diameter portion within the conduit at the mating junction reduces gas or liquid pressure at the mating junction to oppose leakage from the coupling through the mating junction. The reduced pressure at the mating junction within the conduit tends to draw gas (such as air) in from outside the coupling, instead of allowing the contents of the conduit to leak out through the junction.

In a more specific embodiment, a flexible articulated coupling includes a first conduit with a tapering portion in which a gas flow area tapers in a direction of flow through the first conduit. A second conduit externally overlaps the tapering portion of the first conduit, and is articulated with the first conduit, with the tapering portion of the first conduit creating a venturi effect that reduces gas pressure between the second conduit and the tapering portion of the first conduit to inhibit loss of gas from the coupling.

A downstream end of the second conduit itself preferably includes a tapering portion that tapers in the direction of flow through the second conduit. A third conduit externally overlaps the tapering portion of the second conduit to form an articulated connection. The tapering portion of the second conduit creates a venturi effect that reduces gas pressure between the third conduit and the tapering portion of the second conduit at the articulated connection, to inhibit loss of gas from the coupling.

In a yet more specific embodiment, the flexible joint coupling includes upstream and downstream conduits, each having a main conduit portion of substantially constant inner diameter. An intermediate connector or conduit couples the upstream and downstream conduits in axially spaced relationship. An end of the upstream conduit forms a part spherical member that fits within a complementary socket formed by an end of the connector. The connector itself forms a part-spherical connector that fits within a complementary socket formed by an end of the downstream conduit. The part-spherical members and their respective sockets mate in pivotal and rotational sliding relationship along a part-spherical junction. The upstream conduit tapers internally and externally from its junction with the connector, in a downstream direction, to form a first annular lip spaced inwardly from the intermediate connector. The connector member itself tapers internally and externally from its junction with the downstream conduit, in a downstream direction, to form a second annular lip spaced inwardly from the second conduit.

The tapered annular lips create a venturi effect that reduces the gas pressure externally of the annular lips, such that the movement of gas out of the coupling through the junctions is opposed. Because of the vacuum created externally of the lips, gas will tend to be drawn in from outside the coupling, instead of allowing gases inside the coupling to escape.

A better understanding of the invention can be had by reference to the following drawings and detailed description.

DETAILED DESCRIPTION OF PREFERRED EMBODIMENT

The flexible articulated joint disclosed herein is suitable for use in a variety of environments, such as a vehicle exhaust line, steam line, or pressurized gas line. However, for purposes of illustration, the coupling of the present invention will be described in association with an exhaust system in a vehicle, such as a truck, having a gasoline powered internal combustion engine.

Figure 1:
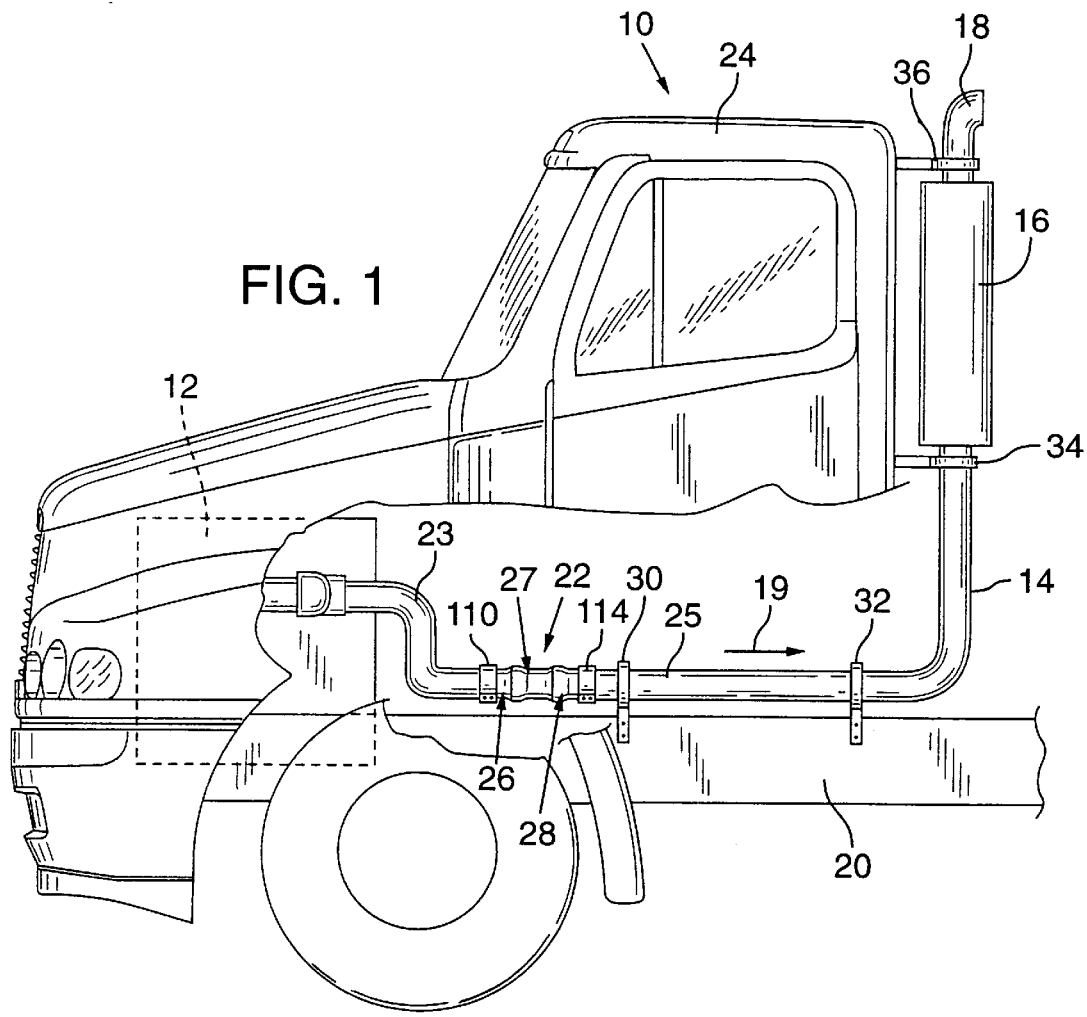
FIG. 1 is a side view of a front portion of a truck, illustrating placement of the flexible coupling of the present invention in the exhaust system.

FIG. 1 illustrates such a truck 10 having an engine 12 that is connected to a chassis 20 by resilient engine mounts (not shown). An exhaust line 14 extends between engine 12 and a muffler 16. The muffler 16 has an exhaust pipe 18 which vents exhaust gases from muffler 16 into the atmosphere. Truck 10 includes the chassis 20 and a cab 24, to which the exhaust line 14 and muffler 16 are mounted. Exhaust gas in line 14 moves in a downstream direction of gas flow 19 from engine 12 to muffler 16, and out exhaust pipe 20.

Because the engine is mounted on flexible mounts that allow engine 12 to move relative to chassis 20, a flexible coupling 22 is included in the exhaust line to accommodate the motion of the engine 12. Coupling 22 separates exhaust line 14 into an upstream pipe 23 and a downstream pipe 25, which are held axially spaced by an intermediate connector 27. Downstream pipe 25 is fixed to the frame or chassis 20 by one or more brackets 30, 32. Muffler 16 is secured to the rear of cab 24 by brackets 34, 36.

Figure 2:
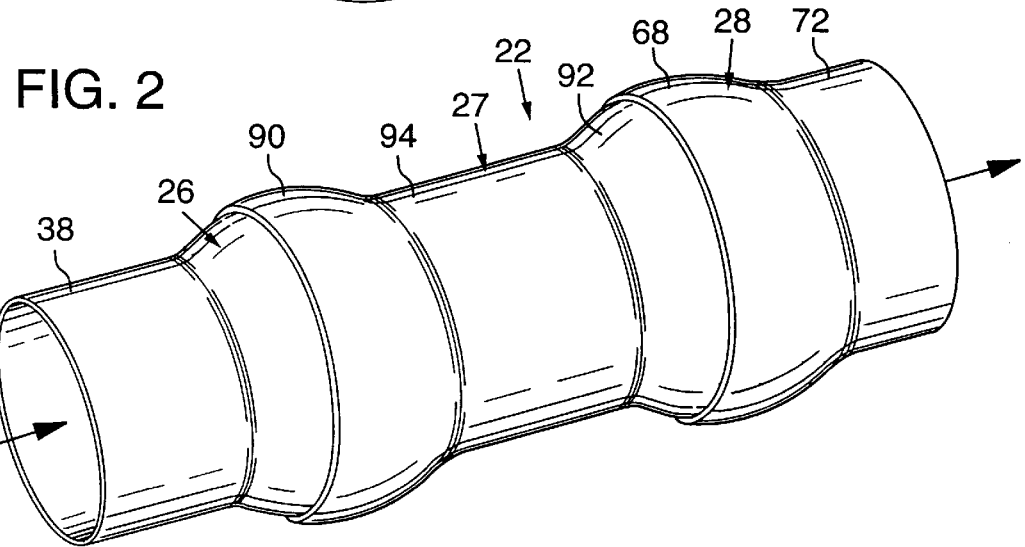
FIG. 2 is an enlarged perspective view of the flexible coupling.
Figure 3:
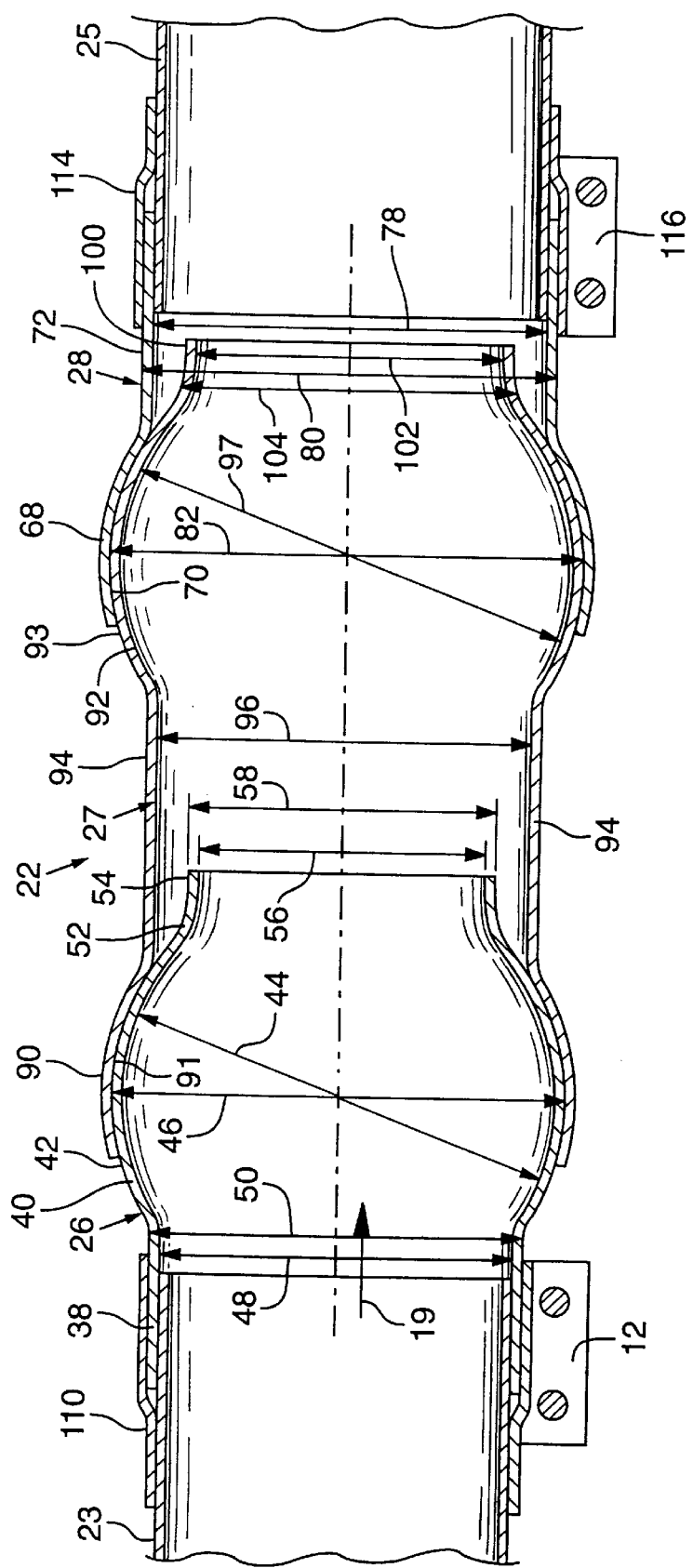
FIG. 3 is a cross sectional side view of the flexible coupling shown in FIG. 2.

A disclosed embodiment of coupling 22 is shown in greater detail in FIGS. 2 and 3. Particularly in FIG. 3, it can be seen that coupling 22 includes an upstream conduit 26 that is joined to upstream pipe 23, and a downstream conduit 28 that is joined to downstream pipe 25. Upstream conduit 26 includes a tubular first portion 38 which has a substantially constant inner diameter 48 and outer diameter 50. Part-spherical intermediate portion 40 of conduit 26 has an inner diameter 44 and an outer diameter 46, both of which are greater than the inner diameter 48 and outer diameter 50 of the tubular first portion 38 of upstream conduit 26. A third portion 52 of upstream conduit 26 tapers in downstream direction 19 to an annular lip 54 having an inner diameter 56 and outer diameter 58, both of which are less than the inner diameter 48 of the first portion 38 of upstream conduit 26.

The downstream conduit 28 includes a first part-spherical intermediate portion 68 that forms a part-spherical concave bearing surface 70, and a tubular second portion 72 that has a substantially constant inner diameter 78 and substantially constant outer diameter 80. Both diameters 78, 80 are less than an inner diameter 82 of the part-spherical concave bearing surface 70.

The connector 27 holds the upstream conduit 26 axially spaced from downstream conduit 28. Connector 27 includes an upstream part-spherical member 90 that presents a concave bearing surface 91 that forms a socket which fits externally in sliding pivotal and relationship around convex bearing surface 42 of upstream conduit 26. Downstream conduit 28 further includes a downstream part-spherical member 92, that presents a part-spherical convex bearing surface 93 that mates internally in sliding pivotal and rotational relationship with a socket formed by concave bearing surface 70 of downstream conduit 28. Part-spherical member 92 has an inner diameter 97 that is greater than inner diameter 96.

Connector 27 also includes an intermediate tubular portion 94 that extends between the upstream and downstream part-spherical members 90, 92 of coupling 22. Intermediate portion 94 has a substantially constant inner diameter 96.

Downstream part-spherical member 92 of connector 27 tapers in downstream direction 19 to an annular lip 100 having an inner diameter 102 and an outer diameter 104. Both inner diameter 102 and outer diameter 104 are less than inner diameter 96 of the intermediate portion 94, less than inner diameter 97 of the part-spherical member 92, and less than inner diameter 78 of second portion 72 of downstream conduit 28.

Annular lips 54, 100 have respective exit openings with inner diameters 56, 102 and outer diameters 58, 104 that are less than inner diameter 96 of intermediate portion 94 of coupling 22. Hence, the annular lips 54, 100 form necked down throat areas that taper in the downstream direction 19 to reduce the cross-sectional area through which gas can flow. As can be seen in the figures, the illustrated necked down throat areas have external surfaces which diverge from the convex bearing surfaces of the overlying conduit moving in a direction toward the exit openings. This tapering cross-sectional area of flow, according to Bernoulli's principle, reduces gas pressure between the lip and the wall of the conduit.

In operation, coupling 22 is installed in a gas exhaust line 14 (FIG. 1) in a gasoline powered vehicle. As illustrated in FIG. 3, upstream pipe 23 tightly fits within conduit 38, and a conventional tube connector band 110 is tightened around the joint with adjustable clamp 112. Similarly, tubular portion 72 of conduit 28 fits tightly around downstream pipe 25, and connector band 114 is tightened around the joint with adjustable clamp 116. As exhaust gases move in the downstream direction of arrow 19, the gas travels from pipe 23, through constant diameter tubular portion 38, into an expanded volume area of part-spherical portion 40, which has a cross-sectional area transverse to the direction of flow 19, which is greater than the cross-sectional area of pipe 23. Gas entering this greater cross-sectional area will slow. The gas then continues to move in the direction 19, through the tapering throat of portion 52.

The diameter of throat 52 tapers to a cross-sectional area (transverse to direction of flow 19), which is less than the cross-sectional areas of portions 38 and 40. As the gas moves through the tapered throat, its velocity increases and pressure decreases. This relationship creates a venturi effect that establishes a vacuum between lip 54 and portion 94 of coupling 22. This venturi effect tends to draw gas in through the junction between bearing surfaces 42, 91 instead of allowing exhaust gases to escape through this junction.

Exhaust gas continues to flow through constant diameter tubular section 94 in direction 19, and the gas expands and slows as it reaches the enlarged diameter area of the downstream part-spherical member 92. The gas flow then again increases in velocity as it moves through the narrowed throat formed by tapered lip 100. As the velocity of the exhaust gas increases, the venturi effect reduces the pressure between lip 100 and tubular portion 72 of downstream conduit 28. The vacuum created by this reduced pressure tends to draw air in through the junction between bearing surfaces 70, 93, and opposes movement of exhaust gases out through this junction.

The flexible coupling of the present invention takes advantage of the part-spherical shape of the coupling joints to provide a cross-sectional area of flow that increases in the part-spherical connector, then decreases again to produce the venturi effect that opposes escape of gas from the coupling. The geometry of the part-spherical connector is arranged such that the cross-sectional area of flow into the part-spherical connector is greater than the cross-sectional area of flow out of the part-spherical connector. The part-spherical connectors therefore serve the dual purpose of allowing pivotal and rotational movement, while simultaneously creating the venturi effect that maintains exhaust gases within the connector. However, other configurations of the connector are possible. The narrowed throat, for example, need not be preceded by an enlarged diameter part-spherical portion.

Figure 4:
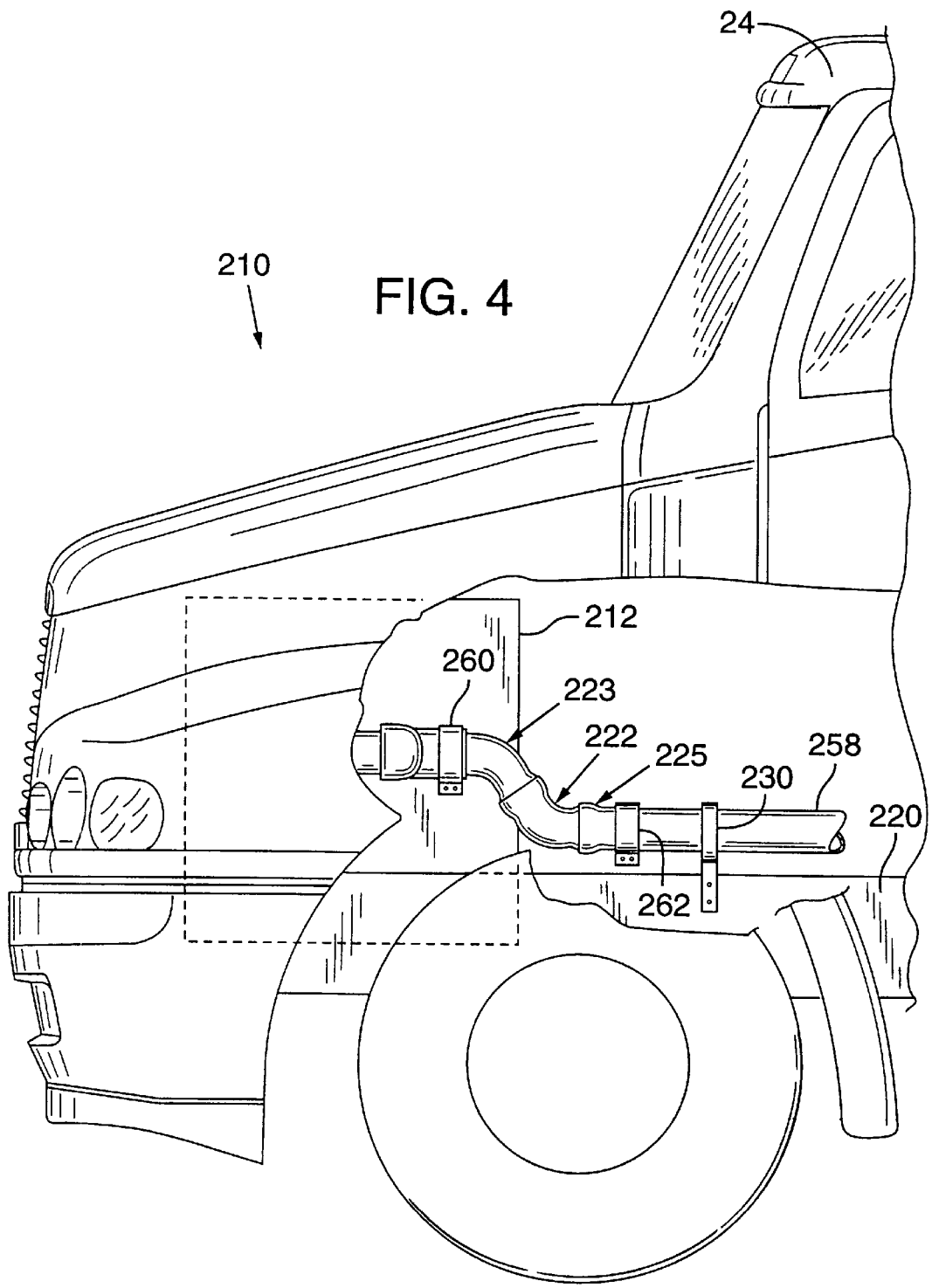
FIG. 4 is a view similar to FIG. 1, but showing an angled embodiment of the coupling.

Yet another embodiment of the invention is shown in FIG. 4. The embodiment of FIG. 4 is similar to that shown in FIGS. 1–3, but the coupling is curved to permit greater freedom of movement of the coupling. FIG. 4 shows a truck 210 having an engine 212 mounted on a chassis 220. An upstream tubular exhaust line 223 leads from engine 212, and is connected to a downstream tubular exhaust line 225 by a tubular flexible connector 222. A clamp 230 secures exhaust line 225 to chassis 220.

Figure 5:
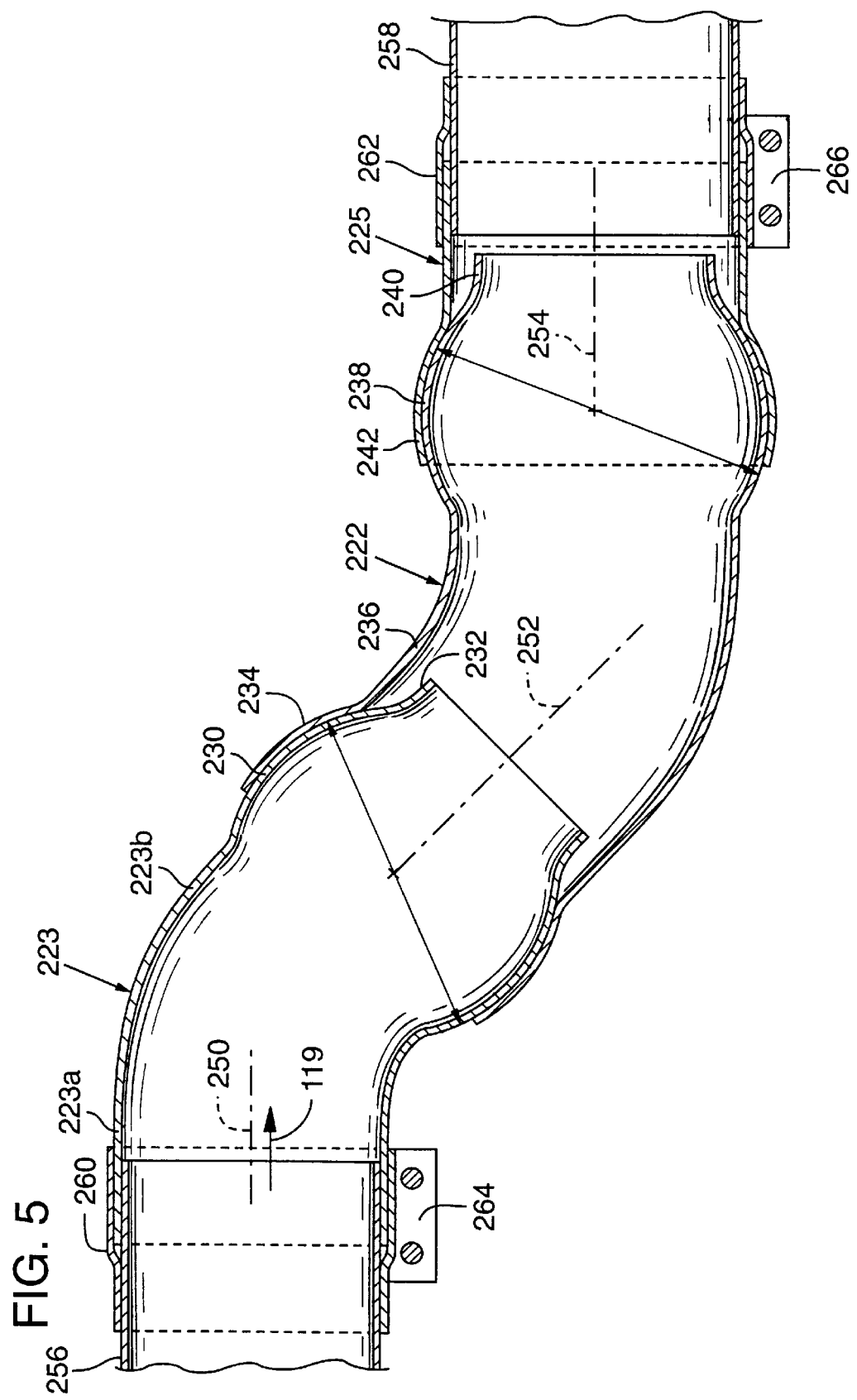
FIG. 5 is an enlarged cross-sectional view of the coupling shown in FIG. 4.

As shown in FIG. 5, upstream line 223 has a first, horizontal constant diameter portion 223a and a downwardly curved second portion 223b. The diameter of curved portion 223b increases, such that portion 223b has a cross-sectional area (perpendicular to a longitudinal axis of the line 223) that expands to form a part-spherical portion 230. The portion 230 then tapers in the downstream direction to an annular lip 232 having a diameter that is less than the constant diameter of portion 223a.

Connector 222 has an enlarged socket end 234 into which part-spherical portion 230 fits, with lip 232 received within and spaced from the walls of connector 222. The diameter of the portion 234 diminishes to a constant diameter intermediate segment 236, which in turn radially expands in the downstream direction to form an enlarged diameter part-spherical portion 238. Portion 238 then tapers to an annular lip 240 having an inner diameter less than the inner diameter of intermediate segment 236.

Downstream line 225 has an enlarged diameter socket 242 into which part-spherical portion 238 fits tightly. The diameter of portion 238 tapers in the downstream direction to a constant diameter segment, the diameter of which is greater than the inner and outer diameters of lip 240.

Coupling 222 is curved to allow greater freedom of movement of the exhaust pipes 223, 225 relative to one another. Portion 223a of exhaust pipe 223 is shown to have a substantially horizontal longitudinal axis 250, while segment 223b is bent down such that its longitudinal axis 252 is at an angle of about 45 degrees from axis 250. The longitudinal axis 254 of portion 238 is again substantially horizontal, and at an angle of about 45 degrees to axis 252. The coupled joints formed by the part-spherical portions are flexible, to accommodate relative axial, rotational and pivotal movement without the parts having to separate or compact together.

The flexible connector shown in FIG. 5 extends between free ends of exhaust lines 256, 258, and is secured thereto by connector bands 260, 262. The bands 260, 262 are tightened around the junction between the flexible connector and exhaust line using an adjustable clamp 264 or 266.

Having illustrated and described the principles of my invention with reference to two preferred embodiments, it should be apparent to those persons skilled in the art that such invention can be modified in arrangement and detail without departing from such principles. Conduits of various configurations may be used to reduce the cross sectional area of flow at a junction in the coupling to create the venturi effect.

The upstream and downstream conduits 26, 28 may be part of the pipes 23, 25, so that the connector 27 flexibly joins the pipes without the necessity of securing the part-spherical members to pipes 23, 25. For example, the pipe 23 would be integral with conduit 26, while pipe 25 would be integral with conduit 28. Welds can replace the flexible band connectors, such as connectors 110 and 114.

I claim as my invention all such modifications as come within the true spirit and scope of the following claims:

1. A flexible joint coupling comprising:
   independently pivotal and rotatable axially spaced first and second conduits that are sealingly engaged with one another along a mating junction, and the conduits form a reduced internal diameter portion that reduces a gas pressure internally of the mating junction to oppose leakage of gas from the coupling through the mating junction, wherein the first conduit has first, second and third sections in the direction of gas flow through the first conduit, the third section of the first conduit having a reduced cross-sectional gas flow area which is less than the cross-sectional gas flow area through the first and second sections of the first conduit, the second conduit overlapping the third section of the first conduit and at least a portion of the second section of the first conduit, the second conduit having a cross-sectional gas flow area in the region of the third section of the first conduit which is configured to be greater than the cross-sectional gas flow area through the third section of the first conduit so as to create a vacuum at the mating junction of the first and second conduits as gas flows through the mating junction of the first and second conduits to thereby oppose leakage of gas from the coupling through the mating junction of the first and second conduits.

2. The flexible joint coupling of claim 1, wherein the coupling is provided in an exhaust line of a vehicle having a combustion engine.

3. The flexible joint coupling of claim 1, further comprising a third conduit, wherein the second and third conduits are independently pivotal and rotatable, axially spaced conduits that are sealingly engaged with one another along a mating junction, and the second and third conduits form a reduced diameter portion that reduces a gas pressure internally of the mating junction between the second and third conduits, that opposes leakage of gas from the conduit;

wherein the second conduit has first, second and third sections in the direction of gas flow through the second conduit, the third section of the second conduit having a reduced cross-sectional gas flow area which is less than the cross-sectional gas flow area through the first and second sections of the second conduit, the third conduit overlapping the third section of the second conduit and at least a portion of the second section of the second conduit;

the third conduit having a cross-sectional gas flow area in the region of the third section of the second conduit which is configured to be greater than the cross-sectional gas flow area through the third section of the second conduit so as to create a vacuum at the mating junction between the second and third conduits as gas flows through the mating junction between the second and third conduits to thereby oppose leakage of gas from the coupling through the mating junction between the second and third conduits.

4. The flexible joint coupling of claim 3, wherein the first and second conduits are pivotally and rotatably engaged by complementary part-spherical portions of the first and second conduits, and the second and third conduits are pivotally and rotatably engaged by complementary part-spherical portions of the second and third conduits.

5. A flexible articulated coupling that minimizes leakage of gas from the coupling, comprising:

a first conduit with a tapering portion that has a gas flow area that tapers in a direction of flow through the first conduit;

a second conduit that externally overlaps the tapering portion of the first conduit, and is articulated with the first conduit, with the tapering portion of the first conduit creating a venturi effect that reduces gas pressure between the second conduit and the tapering portion of the first conduit to inhibit loss of gas from the coupling and;

wherein the first conduit comprises first, second and third sequential portions in the direction of flow, and the second conduit articulates with the second portion of the first conduit, a diameter of the second portion of the first conduit is greater than a diameter of the first portion of the first conduit, and a diameter of the third portion of the first conduit is less than the diameter of the first portion of the first conduit.

6. A flexible articulated coupling that minimizes leakage of gas from the coupling, comprising:

a first conduit with a tapering portion that has a gas flow area that tapers in a direction of flow through the first conduit;

a second conduit that externally overlaps the tapering portion of the first conduit, and is articulated with the first conduit, with the tapering portion of the first conduit creating a venturi effect that reduces gas pressure between the second conduit and the tapering portion of the first conduit to inhibit loss of gas from the coupling;

the second conduit further comprises a tapering portion that has a gas flow area that tapers in the direction of flow through the second conduit;

a third conduit that externally overlaps the tapering portion of the second conduit, and is articulated with the second conduit, with the tapering portion of the second conduit creating a venturi effect that reduces gas pressure between the third conduit and the tapering portion of the second conduit; and wherein the first conduit comprises first, second and third sequential portions in the direction of flow, and the second conduit articulates with the second portion of the first conduit, a diameter of the second portion of the first conduit is greater than a diameter of the first portion of the first conduit, and a diameter of the third portion of the first conduit is less than the diameter of the first portion of the first conduit, further wherein the second conduit comprises first, second, third and fourth sequential portions in the direction of flow, wherein the first portion of the second conduit articulates with the second portion of the first conduit, and a diameter of the second portion of the second conduit is greater than a diameter of the third portion of the first conduit.

7. The flexible articulated coupling of claim 6, wherein the third portion of the first conduit forms an annular lip spaced inwardly from the second conduit, and the fourth portion of the second conduit forms an annular lip spaced inwardly from the third conduit.

8. A flexible joint coupling, comprising:

first and second conduits each having a main conduit portion of substantially constant and equal inner diameter, wherein the second conduit is downstream of the first conduit with respect to a direction of gas flow through the first and second conduits;

an intermediate coupling member between the first and second conduits, that couples the first and second conduits in axially spaced relationship, wherein the coupling member mates in pivotal and rotational sliding relationship with the first conduit along a first junction, and the coupling member mates in pivotal and rotational sliding relationship with the second conduit along a second junction;

further wherein the first conduit tapers internally and externally from the first junction in a downstream direction to form a first annular lip spaced inwardly from the coupling, and the coupling member tapers internally and externally from the second junction in a downstream direction to form a second annular lip spaced inwardly from the second conduit, to reduce a gas pressure between the first and second lips and the coupling, such that the movement of gas out of the coupling through the first and second junctions is opposed.

9. The flexible joint coupling of claim 8, wherein the coupling member has a main body portion between the first and second junctions that has an inner diameter substantially the same as the constant and equal inner diameter portions of the first and second conduits.

10. The flexible joint coupling of claim 8, wherein the coupling does not have a flexible diaphragm around the coupling or along the first or second junctions.

11. A flexible articulated joint, comprising:

an upstream conduit comprising a first portion having a substantially constant inner and outer diameter, an intermediate portion of the upstream conduit that forms a part-spherical convex bearing surface having an inner and outer diameter greater than the inner and outer diameter of the first portion of the upstream conduit, and a third portion that tapers to an annular lip having an inner and outer diameter that is less than the inner diameter of the first portion;

a downstream conduit comprising a first portion that forms a part-spherical concave bearing surface, and a second portion having a substantially constant inner and outer diameter that is less than a diameter of the part-spherical concave bearing surface of the downstream conduit, and an inner diameter that is substantially the same as the inner diameter of the first portion of the upstream conduit; and a coupling for holding the upstream and downstream conduits in axially spaced relationship, wherein the coupling comprises an upstream part-spherical concave bearing surface that mates externally in sliding pivotal and rotational relationship with the convex bearing surface of the upstream conduit, a downstream part-spherical convex bearing surface that mates internally in sliding pivotal and rotational relationship with the concave bearing surface of the downstream conduit, and a substantially constant inner diameter intermediate portion that connects the upstream and downstream bearing surfaces of the coupling, wherein the downstream bearing surface of the coupling tapers to an annular lip having an inner diameter and an outer diameter less than the inner diameter of the intermediate portion and the inner diameter of the second portion of the downstream conduit;

wherein the inner diameter of the substantially constant inner diameter portions of the upstream and downstream conduits are substantially the same as the inner diameter of the intermediate portion of the coupling, and the inner and outer diameters of the annular lip of the upstream conduit is less than the inner diameter of the intermediate portion of the coupling.

12. The flexible articulated joint of claim 11, further comprising an exhaust line of a vehicle in which the joint is placed between an engine and a muffler.

13. The flexible articulated joint of claim 11, wherein the first portion of the upstream conduit has a longitudinal axis that is spaced from and substantially parallel to a longitudinal axis of the first portion of the downstream conduit, and the coupling between the upstream and downstream conduits is curved.

* * * * *